Figure 1:
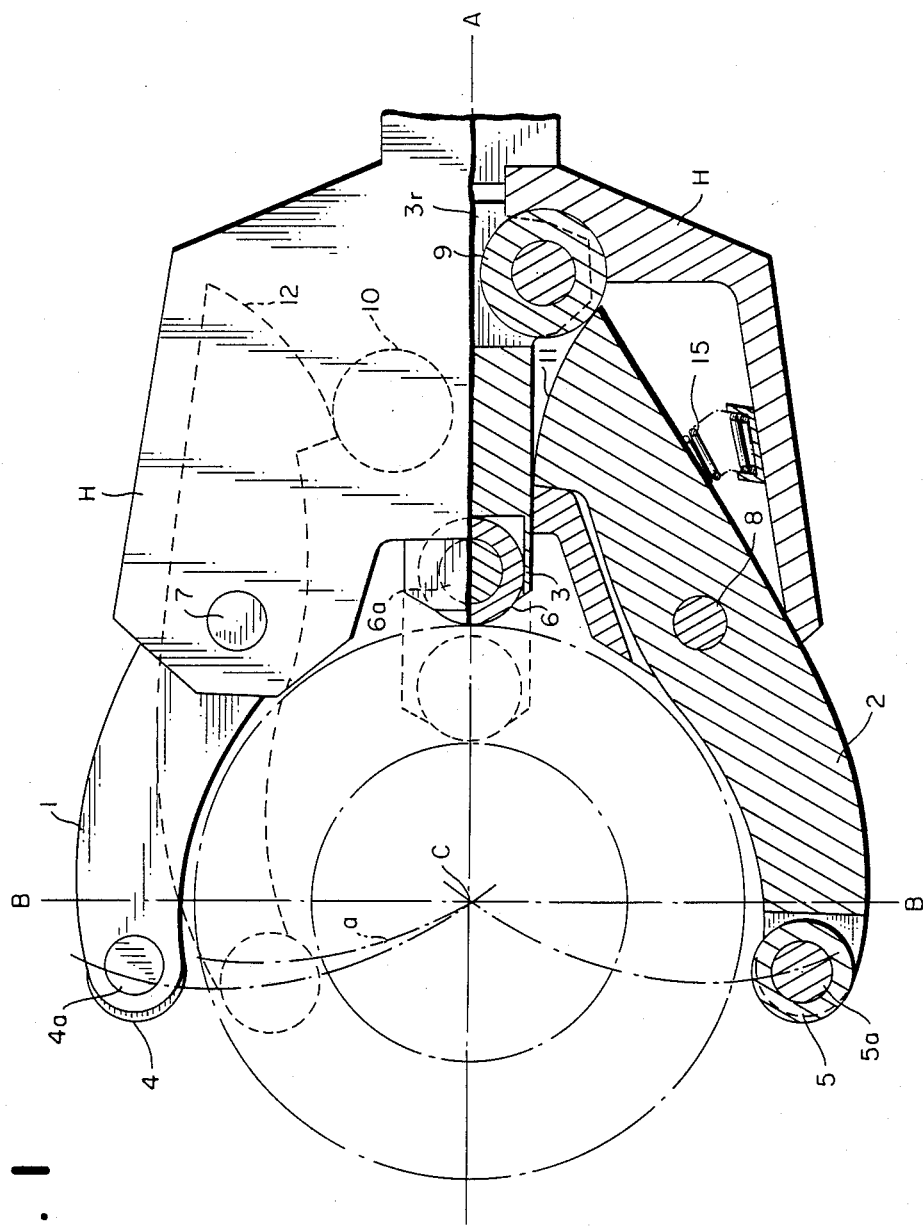

United States Patent [19]

Welin-Berger

[11] Patent Number: 4,823,657
[45] Date of Patent: Apr. 25, 1989

[54] SELF-CENTERING STEADY REST

[76] Inventor: Guy Welin-Berger, Hornsgatan 142, S-11728 Stockholm, Sweden

[21] Appl. No.: 49,999

[22] PCT Filed: Aug. 29, 1986

[86] PCT No.: PCT/SE86/00385
§ 371 Date: May 1, 1987
§ 102(e) Date: May 1, 1987

[87] PCT Pub. No.: WO87/01320
PCT Pub. Date: Mar. 12, 1987

[30] Foreign Application Priority Data

Sep. 3, 1985 [SE] Sweden .................. 8504090

[51] Int. Cl.$^4$ .............................. B23B 25/00
[52] U.S. Cl. ..................... 82/162; 82/164; 51/238 S
[58] Field of Search ............ 82/39, 38 R, 101; 51/238.5

[56] References Cited

U.S. PATENT DOCUMENTS

| | | | |
|---|---|---|---|
| 2,459,068 | 1/1949 | Eastwood | 82/101 |
| 3,535,963 | 10/1970 | Dietl | 82/38 R |
| 4,463,635 | 8/1984 | Hafla | 82/39 |
| 4,517,866 | 5/1985 | Bazuin | 82/39 |
| 4,519,279 | 5/1985 | Ruggeri | 82/39 |
| 4,546,681 | 10/1985 | Owsen | 82/38 R |

FOREIGN PATENT DOCUMENTS

| | | | |
|---|---|---|---|
| 422198 | 11/1925 | Fed. Rep. of Germany . | |
| 0056287 | 5/1891 | Fed. Rep. of Germany | 82/39 |
| 1220954 | 1/1971 | United Kingdom . | |

Primary Examiner—Frederick R. Schmidt
Assistant Examiner—Blynn Shideler
Attorney, Agent, or Firm—Fleit, Jacobson, Cohn & Price

[57] ABSTRACT

A self-centering steady rest with extensive diameter clamping range for centering cylindrical workpieces on machine tools using a constant linear displacement clamping force. The steady rest includes two pivoting levers arranged symmetrically about a linearly displaceable slide with the levers being swingable from their starting position, i.e. the maximum open position of the steady rest, in which the levers have a V-shaped configuration, to a final position in which the levers are substantially parallel to each other. The steady rest is of compact construction reducing the amount of space required for the steady rest in a machine tool.

4 Claims, 3 Drawing Sheets

SELF-CENTERING STEADY REST

The present invention relates to a self-centering steady rest for machine tools, e.g. lathes, for centering long, circular cylindrical pieces and overhangs, said steady rest comprising two similar, pivoting levers arranged in symmetry relative to a plane of symmetry A—A passing through the centering point, and which at their ends adjacent the workpiece are provided with rotatable supporting rollers, a slide linearly displaceable radially relative to the centering point of the workpiece, said slide being provided at its end in contact with the workpiece with a rotatable supporting roller and being arranged in said plane of symmetry for the levers in such a way that the point of contact of the slide with the workpiece lies on that side of a plane perpendicular to the direction of displacement of the slide and passing through the centering point, which is opposite to the pivot lever contact points symmetrically arranged relative to said plane of symmetry, a guide means in the form of a cam and cam follower, said means coupling the displacement of the slide to the pivot movement of the levers, so that the three contact points with the workpiece are always at the same radial distance from the centering point, and a device for displacing the slide.

Steady rests of this type have been known for quite some time, see e.g. GB No. 1 220 954 (FIG. 5) and are based on the principle known by German Patent Specification No. 422 198. This known steady rest has, however, certain drawbacks. For example, the clamping force of the levers varies considerably when centering workpieces of varying diameters if the same linear displacement force is applied to the slide. The clamping force thus decreases with decreasing workpiece diameters. In order to compensate for this decrease, there are two possibilities with the known steady rest: to either increase the linear displacement force on the slide with decreasing workpiece diameter, or to apply from the beginning such a linear displacement force to the slide that the required clamping force is provided even for the smallest workpiece diameter within the working range of the steady rest.

Neither of these possibilities is really suitable for modern day machine tools. Providing for adjustment of the linear displacement force on the slide by changing the working pressure in a hydraulic cylinder for example, involves an additional installation operation slowing down production, and a constant large linear displacement force can mean that the increasing clamping force with increasing workpiece diameter can deform the workpiece, particularly when machining thin-walled materials.

In a known steady rest of this type the latter solution was selected with constant working pressure in a hydraulic or pneumatic cylinder. Geometric limitations as regards the design of the levers themselves and the total size of the steady rest, the clamping force relationships described above and the permissible clamping force variation, are such that this known steady rest is manufactured in a number of different models for different clamping ranges, i.e. ranges within which the diameter of a workpiece can lie to obtain an appropriate clamping force. Since the variation in clamping force is too great in these steady rests as well, they are not suitable for machining easily deformable materials either, especially turning thin-walled materials.

A steady rest, with a cam follower joined to the slide and cam curves on the ends of the levers, is known by U.S. Pat. No. 4 519 279. In this known steady rest, however, a pneumatic jack is controlled in response to variations in the diameter of the workpiece. They have thus taken a completely opposite approach to solving the problem of clamping force variation than according to the present invention. It is also evident from the weak design of the levers for example, that this known steady rest is intended for much weaker clamping forces than the design according to the invention, which should be able to withstand clamping forces in the order of 20 kN.

Furthermore, the design according to the invention reduces the total size, which is a distinctive advantage since the available space in modern machine tools is decreasing. The pivoting configuration of the levers is such that in the starting position these levers extend from their housing in a V-formation. This is an essential feature since today's machine tools often have an inclined machine bed and a vertical protective plate, between which the steady rest must be placed. This V-formation makes the design according to the invention easier to use in modern machine tools. An additional advantage is that the clamping range for individual steady rests can be enlarged.

Figure 2:
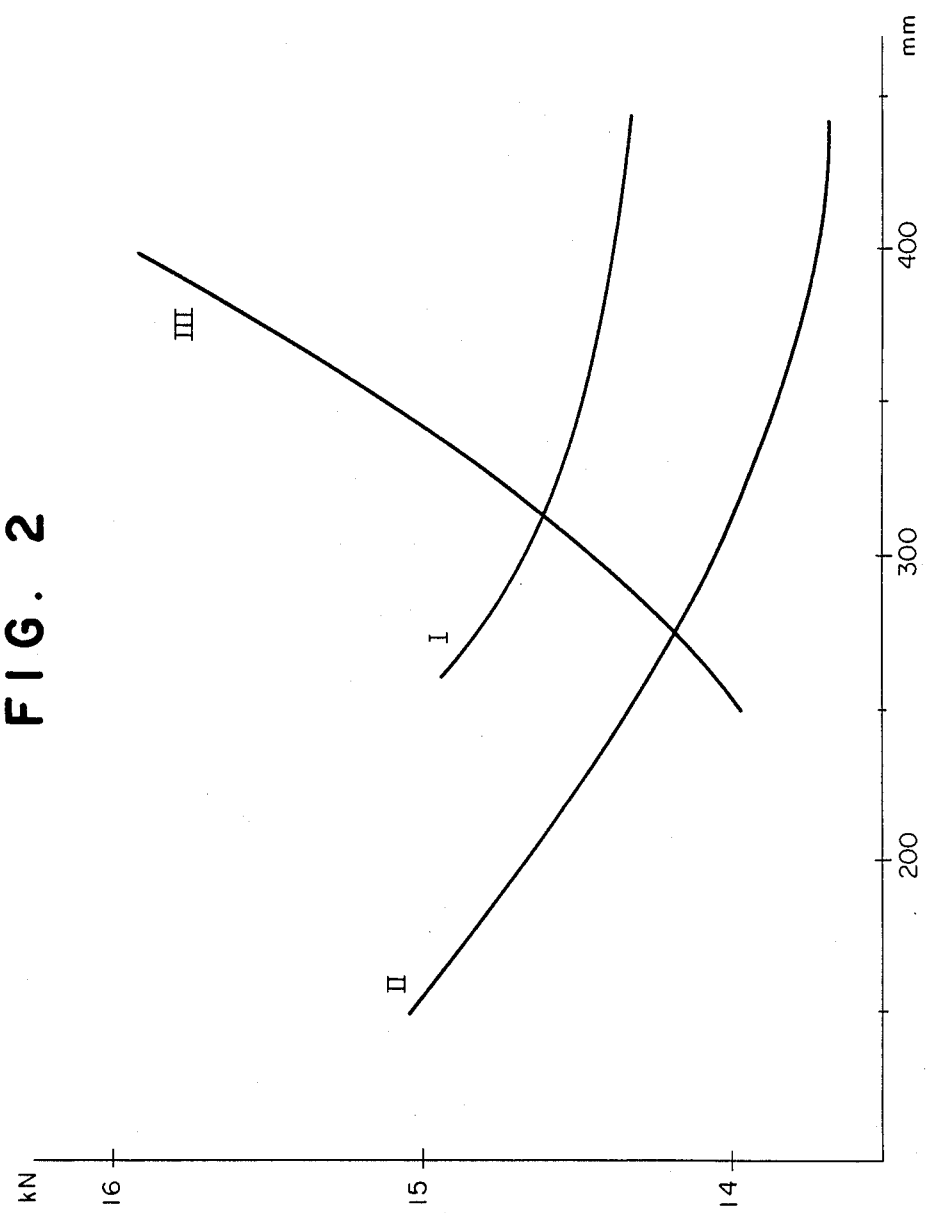
Figure 3:
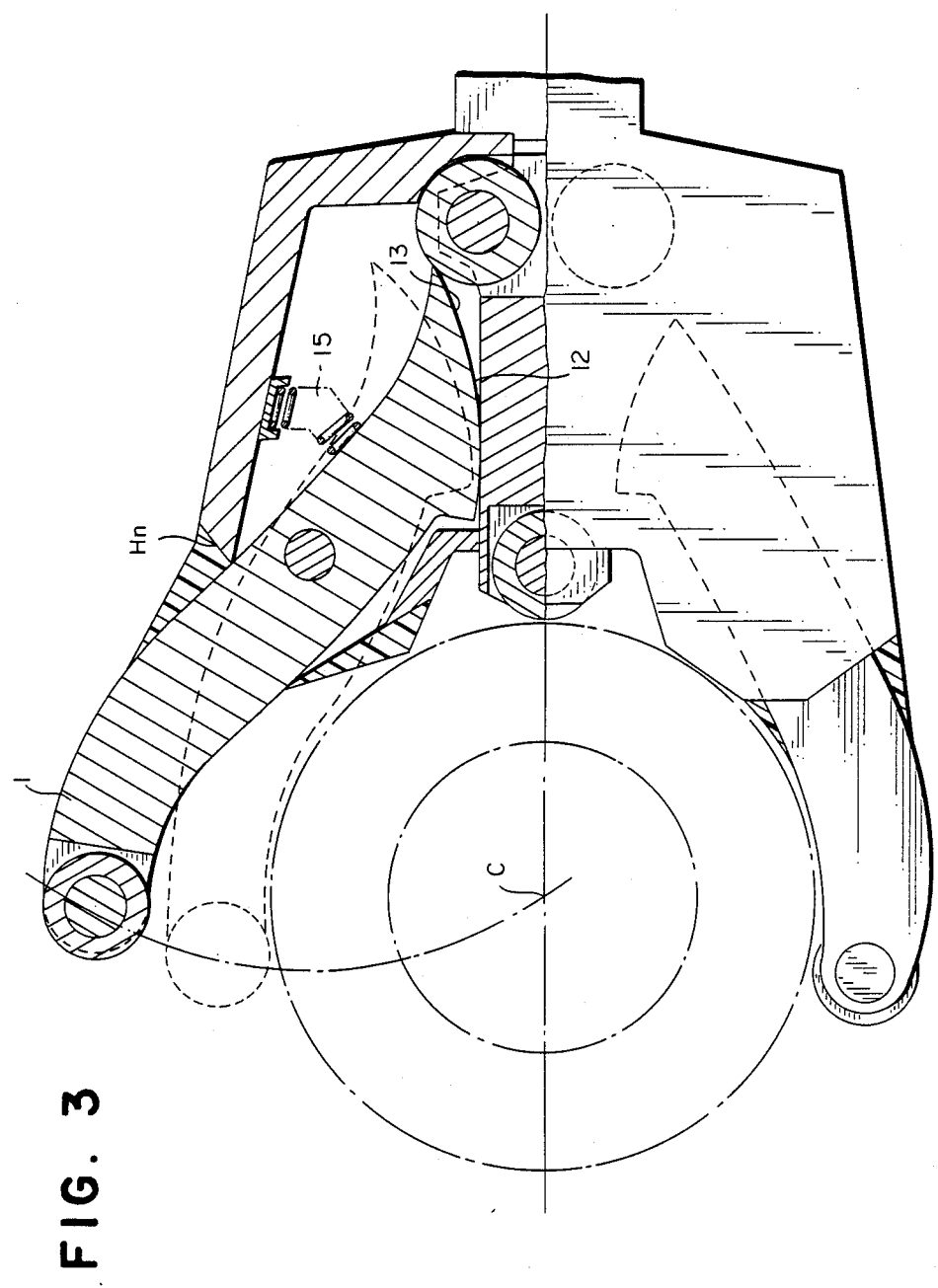

In order to elucidate the invention, an example will be described in more detail below with reference to the accompanying drawings, of which FIG. 1 shows a side view, partially in section, of a steady rest according to the invention, FIG. 2 shows a diagram of the clamping force as a function of workpiece diameter at a working pressure in the cylinder of 60 bar, for two different embodiments of a steady rest according to the invention and for a known steady rest, and FIG. 3 shows a variant of a steady rest according to the invention, in which the upper lever can be swung upwards from its upper working position.

The steady rest shown in FIG. 1 has two identical pivoting levers 1,2 arranged symmetrically relative to the center line A—A through the centering point C and a slide 3 of relatively thin construction vertically, as viewed in FIG. 1, and which is linearly displaceable radially in relation to the centering point. The levers and the slide carry at their ends to be pressed against the workpiece, rotatable support rollers 4, 5 and 6 on pivot pins or axles 4a, 5a and 6a, respectively. The levers are rotatably mounted on pivot pins or axles 7,8 fixed in a housing H, shown schematically here, the front wall of which is level with the pivot pin bearings. This housing is suitably sealed off from the environment so that chips and the like are prevented from penetrating into the housing.

In order to achieve the desired centering, the points of contact 4,5,6 of the support rollers with the workpiece must always lie equidistant from the centering point C. The support roller 6 is displaced linearly and its point of contact will always lie on the same radial line, lying in the plane of symmetry A—A and passing through the centering point C of the steady rest. The support rollers 4,5 are displaced, however, in circular paths about their respective pivot pins 7,8 and their points of contact will thus lie on different radial lines, which, as the levers are swung towards the centering point C, form larger and larger angles with the axis B—B, which is perpendicular to the plane of symmetry A—A. The points of contact for the support rollers 4,5 will describe a curve a as the levers are swung outwards, which coincides at C with the circular path of movement of the axis of the support roller and gradually diverges from this circular path. It goes without saying, of course, that the circular paths described by the axes of the support rollers must pass through the centering point C.

The swinging movement of the levers 1,2 and the linear displacement of the slide 3 must always be coupled so that the change in the distance of the lever contact points (curve a) to the centering point C, agrees with the axial displacement of the slide 3.

For this purpose, the slide 3 is provided, on both sides at its end directed away from the centering point, with cam followers 9,10 in the form of rollers, and the levers 1,2 are provided at their ends directed away from the centering point with mirror-imaged cams 11,12, which cooperate with the cam followers 9,10 to swing the levers through the angle corresponding to the radial axial displacement of the slide. The remote end of the slide is connected in a suitable manner to a power means achieving the desired displacement of the slide. This means suitably consists of a hydraulic or pneumatic cylinder, and the slide is connected to its moving part. Other types of power means or connecting elements are conceivable, however.

The steady rest works in the following manner. The workpiece is inserted between the two levers 1,2 and the power means is activated. Due to the fact that in the comparative trials presented in FIG. 2 between a known steady rest and two embodiments of a steady rest according to the invention, hydraulic cylinders were used with constant working pressure, in the following it is assumed that the power means is such a cylinder.

When the hydraulic cylinder is pressurized, the slide is displaced towards the centering point C. The cam followers 9,10 are also displaced thereby, and the levers 1,2 will pivot about the pins 7,8 due to the interaction of the cam followers and the cams 11,12. When the support rollers 4,5 of the levers come into contact with the workpiece, it will be pressed against the support roller 6 and the displacement movement of the slide will be halted.

In order to reduce, in comparison with known designs, the variation in clamping force exerted by the support rollers on the workpiece, cams 11,12 are provided on the ends of the levers 1,2 on their sides facing the slide 3. This provides a power transmission where the distance between the lever pivot center and the cam follower/cam contact point decreases as the slide is displaced towards the centering point. Simultaneously, at the contact point the force component perpendicular to a line through the pivot center and this contact point will increase in magnitude. These two factors counteract each other and the variation in clamping force is therefore reduced in comparison to known steady rest designs of this type. By virtue of the fact that the cam is disposed on the lever and follows its pivot movement, the cam can be flatter than if it only moves rectilinearly. This also improves the force transmission.

As can be seen in FIGS. 1 and 3, the cam follower rollers 9 and 10 are journalled directly on the slide so that the rollers are partially disposed in recesses 3r in the slide and only extend partially outside of the slide, and so that no part of the slide projects on opposite sides of the plane of symmetry A—A beyond the parts of the cam follower rollers extending out from the slide. The cams 11 and 12 can thus be placed as close as possible to the slide to make the distance between the contact points for the cam follower rollers and the pivot centers as great as possible. In addition to providing a longer lever for the displacement force, the reduction of this distance, as the slide is displaced, will be less on a percentage basis than the reduction in the case of a cam curve parallelly displaced outwardly from the slide. This as well contributes to a reduction of clamping force variation relative to known designs. As is clearly shown in FIG. 1, each of the cam followers 9 and 10 also is essentially as large as permitted by the available space between the slide 3 and the wall of the housing H so that the associated cam 11 or 12 has a relatively flat cam surface.

FIG. 2 shows the clamping force as a function of the diameter of the workpiece for two steady rests according to the invention with different clamping ranges and for a known steady rest. All of the steady rests use a hydraulic cylinder with a working pressure of 60 bar.

The curves I and II are for steady rests according to the invention with clamping ranges of 200–400 mm and 150–460 mm, respectively, and curve III is for a known steady rest with a clamping range of 240–400 mm.

A comparison of the clamping force curves for the two embodiments of steady rests according to the invention reveals that the force transmission is somewhat less effective for the design with the larger range, to the extent that the clamping force is lower for the same diameter workpiece (13.7 kN vs. 14.35 kN for a workpiece diameter of 460 mm). The reason for this can be seen by looking at the position of the upper lever 1 in its inward position shown in FIG. 1 with dashed lines. In order to swing its support roller 4 further inwards and thereby increase the clamping range, this can only be achieved by pushing the cam 12 vertically upwards. In order to enable the support roller 4 to also assume its outermost working position in such a case, the length of the cams 11,12 and the slide 3 must be increased. The backward extension of the cams 11,12 has, however, a somewhat sharper curvature than the front portions of the cams as shown in FIG. 1, and the force component perpendicular to the line between the point of contact and the lever pivot point will thus be of lesser magnitude and the clamping force for curve II, for the same clamping range, will thus be less than for curve I.

The variation of clamping force will, however, be the same within the same diameter range for the workpieces, since curve II, as can be seen in FIG. 2, is merely a parallel displacement of curve I within the range 260–450 mm.

A comparison of curve III for the known steady rest, in which the cam is made on the slide, with the curves I and II reveals that curves I and II are less steep than curve III, which means that the variation in clamping force will be less for the steady rests according to the invention. Within the diameter range common to all three curves, 260–400 mm, the variation in clamping force for curves I and II is only about 0.5 kN, while the same variation for curve III is 2 kN. The invention thus achieves an appreciable reduction in the clamping force variation.

A direct comparison between the force transmission in the known steady rest and in the steady rests according to the invention, as was done above when comparing curves I and II, cannot be done since the geometric configurations of these designs are completely different. It can be noted, however, that the lowest clamping force, which is the crucial design value, is approximately at the same level, and this is a precondition for the comparison of clamping force variations to be meaningful.

In order to further reduce the variation in clamping force, compression springs 15 of suitable type can be arranged between the housing wall and the sides of the levers facing away from the slide, as indicated schematically in FIG. 1. The force exerted by the springs increases when the levers are swung inwards to center workpieces of smaller diameter, and this counteracts the above-mentioned increase in magnitude of the force component produced by the cam. Thus, the curves I and II in FIG. 2 can be made even flatter by selection of appropriate springs.

FIG. 3 shows a variant of the invention in which the upper lever can be swung from its outermost working position even further upwards so that it can be placed more nearly vertically in relation to the horizontal plane of the machine when mounted in the machine. This provides the significant advantage that workpieces, within the entire clamping range, can be fed into the steady rest from directly above. As can be seen in FIG. 3, in which the lever 1 is shown in its outermost position, this is achieved by providing a notch Hn in the housing H, which permits the cam 12 to be swung further forwards by means of the spring 15. The lever is also provided with a guide curve 13 which by means of the displacement of the cam follower moves the lever 1 to the position corresponding to the starting position of lever 2. In this position the upper cam follower 10 leaves the guide curve and will come into contact with its cam at the same time as the lower cam follower 9.

The purpose of the invention is to reduce as much as possible the variation in clamping force and this has also been the goal in dimensioning the steady rest according to the invention. It will thus be understood that by moving the cam follower roller outwards, the clamping range can be increased by increasing the cam length at the same time. The larger the cam follower roller is, the less the cam curvature must be, in order for the axial displacement of the slide to achieve the same lever pivot arc as for a smaller roller. Considering clamping force variation, it is thus advantageous to use a cam follower which is as large as possible to thus provide a flatter cam curve. At the same time, the use of a flatter cam curve will mean that it will be longer than a more sharply curved cam, and for this reason in many cases available space will prevent optimum dimensioning of the cam curve and the cam follower.

As is evident from the preceding description, there is achieved according to the invention a steady rest with a small variation in clamping force. This steady rest has furthermore a number of other advantages over known steady rests, such as smaller overall dimensions, a greater diameter range for the same allowable clamping force variation and a clamping force curve more conducive to machining thin-walled materials, which can withstand higher clamping forces when the diameter is less.

I claim:

1. A self-centering steady rest with extensive diameter clamping range for machine tools, e.g. lathes, for centering long, cylindrical workpieces and overhangs using a constant linear displacement clamping force, comprising:
   a housing,
   two similar, pivoting levers arranged in symmetry relative to a plane of symmetry passing through a centering point for a workpiece and pivotable about axles extending parallel to said plane of symmetry, said axles being supported in the housing and each of said levers having a first part swingable inside the housing and a second part protruding outside the housing, and said levers having starting positions in which said levers have a V-shaped configuration and can receive workpieces of various diameters between said second parts for a clamping operation, and from which the second parts of said levers move toward one another for the clamping operation,
   an elongated slide linearly displaceable between the pivoting levers and movable in said plane of symmetry and perpendicularly to said pivot axles for the pivoting levers, an end of said slide which is turned towards the centering point for the workpiece cooperating with ends of said second parts of the levers to hold between them the workpiece, and said slide end and said lever ends each being provided with a rotatable workpiece supporting roller which contacts the workpiece when the steady rest is operated,
   coupling means in the form of a cam on an end portion of each of said inner first parts of the levers and cam followers in the form of rollers mounted on portions of the slide, the rollers being partially disposed in recesses in the slide adjacent respective sides of said lever end portions facing the slide and having such a shape that a linear displacement of the slide towards the centering point of the workpiece causes such a pivoting of the levers that contact points for said workpiece supporting rollers with the workpiece are always at the same radial distance from the centering point, and
   a device operable with constant working pressure for displacing the slide at a constant linear displacement force throughout the entire diameter clamping range of the levers, wherein the levers are essentially solid except for holes accommodating said pivoting axles and axles for supporting said rotatable supporting rollers in the ends of the said second parts of the levers, the levers being swingable from their starting positions, i.e., the maximum open position of the steady rest, in which the levers have the V-shaped configuration, to final positions in which the levers are substantially parallel to each other, and wherein the slide is of thin construction and the cams on the ends of the first parts of the levers, are closely adjacent to the plane of symmetry as a result of said cam follower rollers being partially disposed in said recesses in said thin slide, with no part of the slide, including the roller-mounting portions, projecting on opposite sides of the plane of symmetry beyond parts of the cam follower rollers extending out from the slide.

2. A steady rest according to claim 1, wherein each cam follower roller is essentially as large as permitted by the available space between the slide and a wall of the housing so that the associated cam on each lever has a relatively flat cam curve.

3. A steady rest according to claim 1, wherein a compression spring is arranged between a wall of the housing and a side of each lever facing away from the slide to counteract an increase in a force component produced by the respective cam on the lever as the lever is pivoted by the respective cam follower roller on the slide into clamping engagement with the workpiece.

4. A self-centering steady rest with extensive clamping range for machine tools, e.g. lathes, for centering long, cylindrical workpieces and overhangs, comprising:

a housing, two similar, pivoting levers arranged in symmetry relative to a plane of symmetry passing through a centering point for a workpiece and pivotable about axles extending parallel to said plane of symmetry, said axles being supported in the housing and each of said levers having a first part swingable inside the housing and a second part protruding outside the housing, and said levers having starting positions in which said levers have a V-shaped configuration and can receive a workpiece of various diameters up to a preselected maximum diameter between said second parts for a clamping operation, an elongated slide linearly displaceable between the pivoting levers and movable in said plane of symmetry and perpendicularly to said pivot axles for the pivoting levers, an end of said slide which is turned towards the centering point for the workpiece cooperating with ends of said second parts of the levers to hold between them the workpiece, and said slide end and said lever ends each being provided with a rotatable workpiece supporting roller which contacts the workpiece when the steady rest is operated, coupling means in the form of a cam on an end portion of each of said inner first parts of the levers and cam followers in the form of rollers mounted on the slide, the rollers being partially disposed in recesses in the slide adjacent respective sides of said lever end portions facing the slide and having such a shape that a linear displacement of the slide towards the centering point of the workpiece causes such a pivoting of the levers that contact points for said workpiece supporting rollers with the workpiece are always at the same radial distance from the centering point, and the rollers being essentially as large as permitted by the available space between the slide and a wall of the housing so that the associated cam on each lever has a relatively flat curve, and a device for displacing the slide, wherein the levers are essentially solid except for holes accommodating said pivoting axles and axles for supporting said rotatable supporting rollers in the ends of said second parts of the levers, the levers being swingable from their starting positions, i.e., the maximum open position of the steady rest, in which the levers have the V-shaped configuration, to a final position in which the levers are substantially parallel to each other, and wherein the slide is of thin construction and the cams on the ends of the first parts of the levers are closely adjacent to the plane of symmetry, with no part of the slide projecting on opposite sides of the plane of symmetry beyond parts of the cam follower rollers extending out from the slide, and with one of the levers being receivable in a notch in the housing so as to be displaceable further outwards from its starting position independently of and relative to said other lever, to receive a workpiece of greater diameter than the maximum diameter of the workpiece receivable when both of said levers are in their starting positions.

* * * * *